United States Patent [19]

Andresen

[11] Patent Number: 4,507,601

[45] Date of Patent: Mar. 26, 1985

[54] LEVER STROKE CONTROL

[76] Inventor: Herman J. Andresen, 726 Carriage Hill, Glenview, Ill. 60025

[21] Appl. No.: 469,584

[22] Filed: Feb. 25, 1983

[51] Int. Cl.³ .............................................. G05G 9/04
[52] U.S. Cl. .................................... 323/347; 323/330; 340/870.33; 340/870.36; 74/491; 74/523
[58] Field of Search ............... 323/264, 250, 330, 347, 323/362; 340/870.33, 870.35, 870.36; 336/110, 132; 74/471 R, 477, 491, 523–525, 529, 536–538

[56] References Cited

U.S. PATENT DOCUMENTS

| | | | |
|---|---|---|---|
| 2,568,588 | 9/1951 | MacGeorge | 323/347 X |
| 2,852,732 | 9/1958 | Weiss | 323/94 |
| 2,854,591 | 9/1958 | Immel et al. | 323/330 X |
| 2,866,953 | 12/1958 | Stratton | 323/330 X |
| 2,903,663 | 9/1959 | Collina | 323/347 X |
| 3,128,625 | 4/1964 | Heineman | 73/209 |
| 3,235,790 | 2/1966 | Collins | 323/347 |
| 3,267,404 | 3/1966 | Hieronymus | 338/32 |
| 3,305,770 | 2/1967 | Hulls | 338/32 |
| 3,395,341 | 7/1968 | Malaquin | 324/70 |
| 3,462,673 | 8/1969 | Hieronymus | 323/69 |
| 3,474,332 | 10/1969 | Brown | 324/34 |
| 3,691,502 | 9/1972 | Kataoka | 338/32 |
| 3,698,531 | 10/1972 | Bernin | 197/98 |
| 3,718,872 | 2/1973 | Takeuchi | 332/51 R |
| 3,735,244 | 5/1973 | Gumtau et al. | 323/347 |
| 3,753,202 | 8/1973 | Kataoka et al. | 338/32 H |
| 3,818,326 | 6/1974 | Masuda et al. | 324/34 PS |
| 3,958,202 | 5/1976 | Sidor | 336/110 |
| 3,958,203 | 5/1976 | Bernin | 336/110 |
| 3,988,710 | 10/1976 | Sidor et al. | 338/32 R |
| 4,088,977 | 5/1978 | Bowman, Jr. et al. | 338/32 |
| 4,121,185 | 10/1978 | Genz | 336/110 |
| 4,137,512 | 1/1979 | Sidor | 335/206 |
| 4,229,993 | 10/1980 | Andresen | 74/538 |
| 4,332,177 | 6/1982 | Andresen | 74/491 |

OTHER PUBLICATIONS

Licon Product Bulletin PS-1000, Series 33, Position Sensors and Signal Conditioner, (Illinois Tool Works, 1979), (4 pp.).
Monsun-Tison Brochure, (8 pp.).

Primary Examiner—Peter S. Wong
Attorney, Agent, or Firm—Leydig, Voit, Osann, Mayer & Holt, Ltd.

[57] ABSTRACT

A manual controller for producing an output signal for control of hydraulic valves and the like. The controller has a quadrant lever consisting of an inner tube connected to a shaft and an outer tube slidable thereover. The inner tube has a palm rest at its upper end while the outer tube has an annular finger grip. The inner tube carries a slidable plug which is downwardly spring pressed and which is coupled to the outer tube to urge the finger grip downwardly away from the palm rest. A cam track is arranged on the frame closely parallel to the plane of swinging movement of the lever. The cam track is engaged by a cam follower which is secured to the outer tube. The cam track is so contoured that in the arc of movement of the lever from its reference position the cam follower thereon is yieldingly obstructed by the cam track so that progressive free movement of the lever must be accompanied by progressive squeezing movement of the hand of the operator with the result that the squeezing movement controls the progress of rocking movement. A drum is secured to the shaft and a pair of magnetically saturable tubes are arranged parallel to, and slightly spaced from, the drum. Extensive permanent magnets on the drum cooperate with the respective tubes, each of the magnets being so formed as to have a helically orientated edge, the magnets being arranged in a projected mirror image relation so that rocking of the drum by the lever results in progressive differential saturation of the tubes in a sense which depends upon the direction of lever movement thereby to produce an output signal which depends upon the direction and amount of lever movement.

21 Claims, 27 Drawing Figures

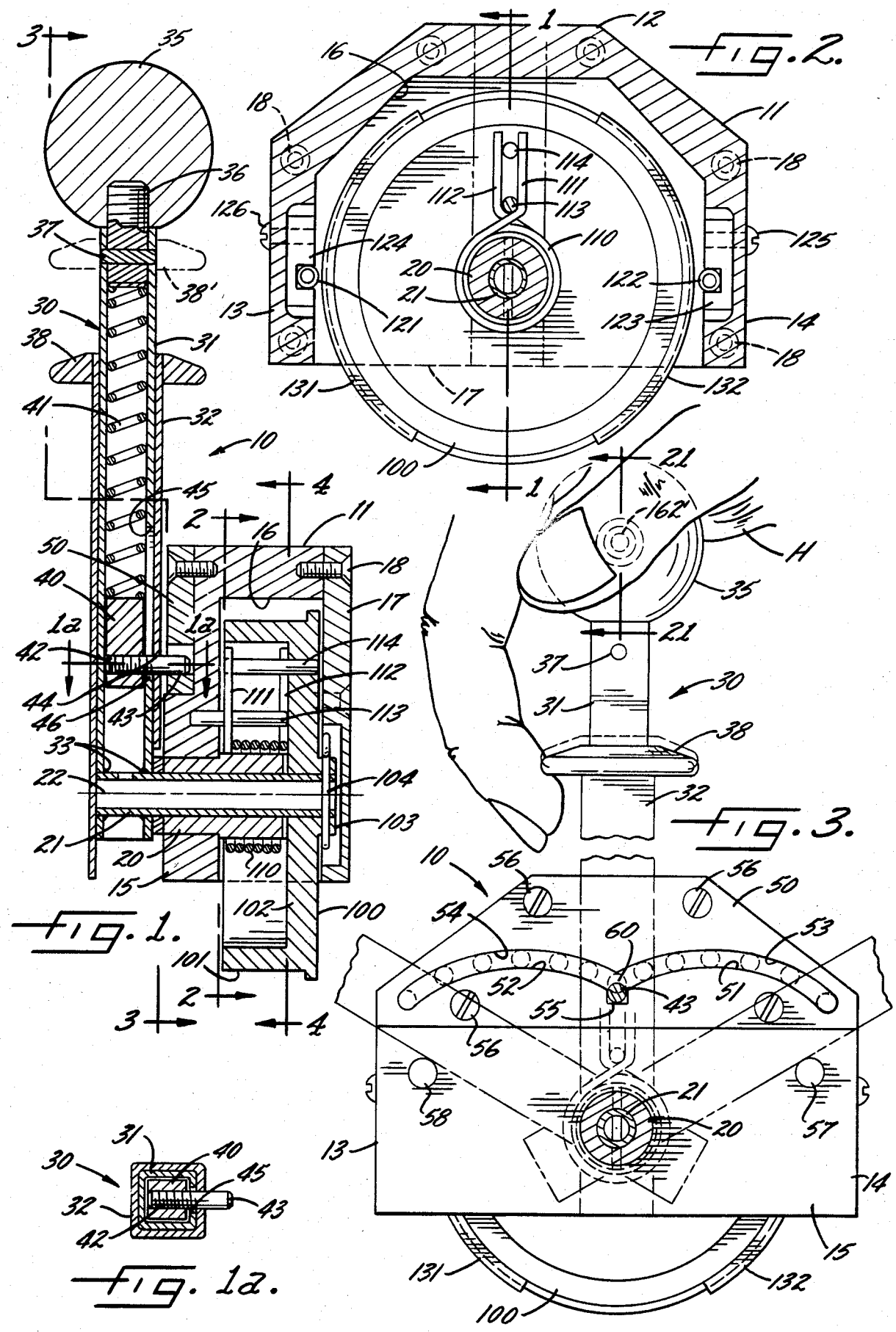

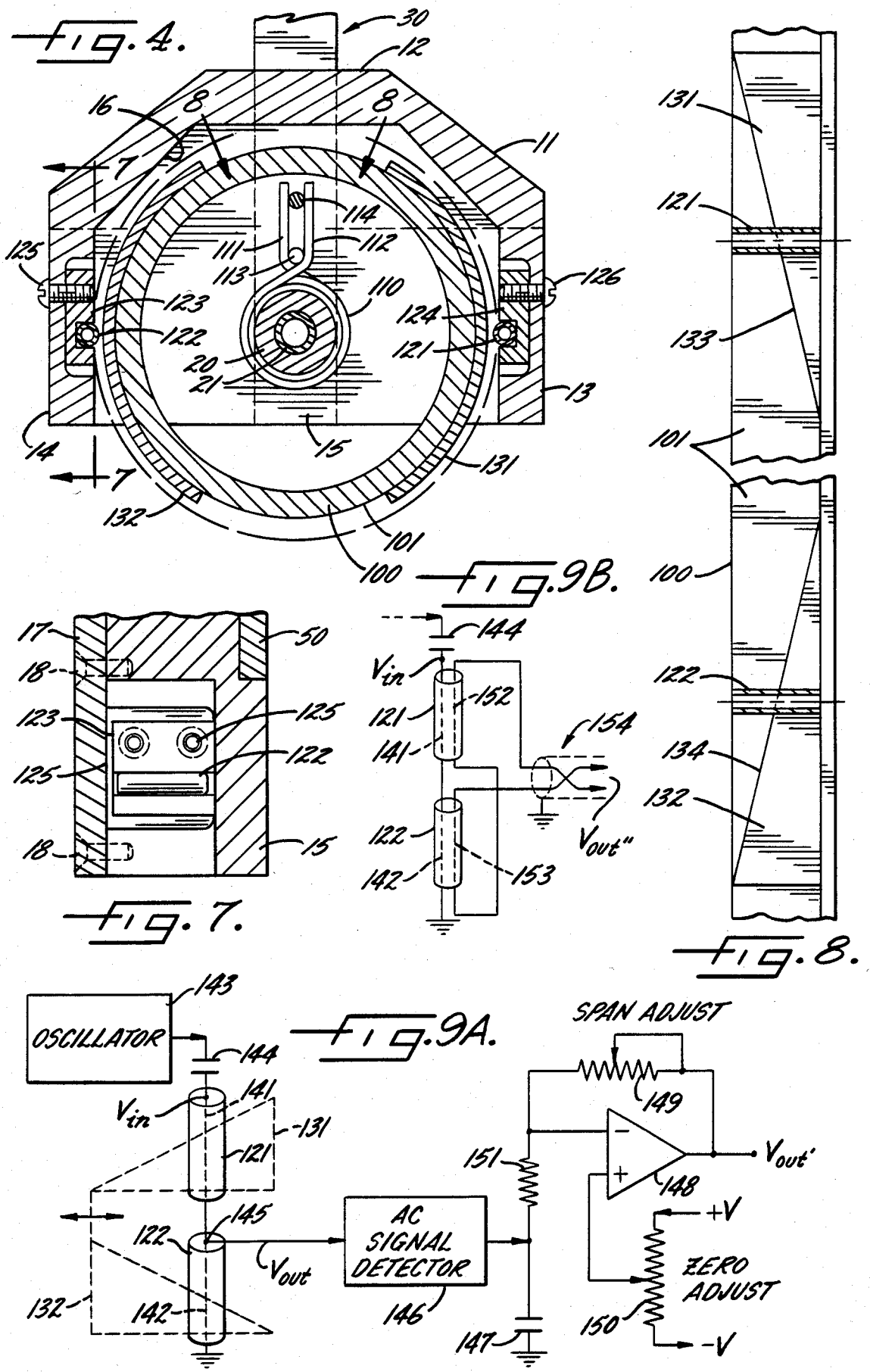

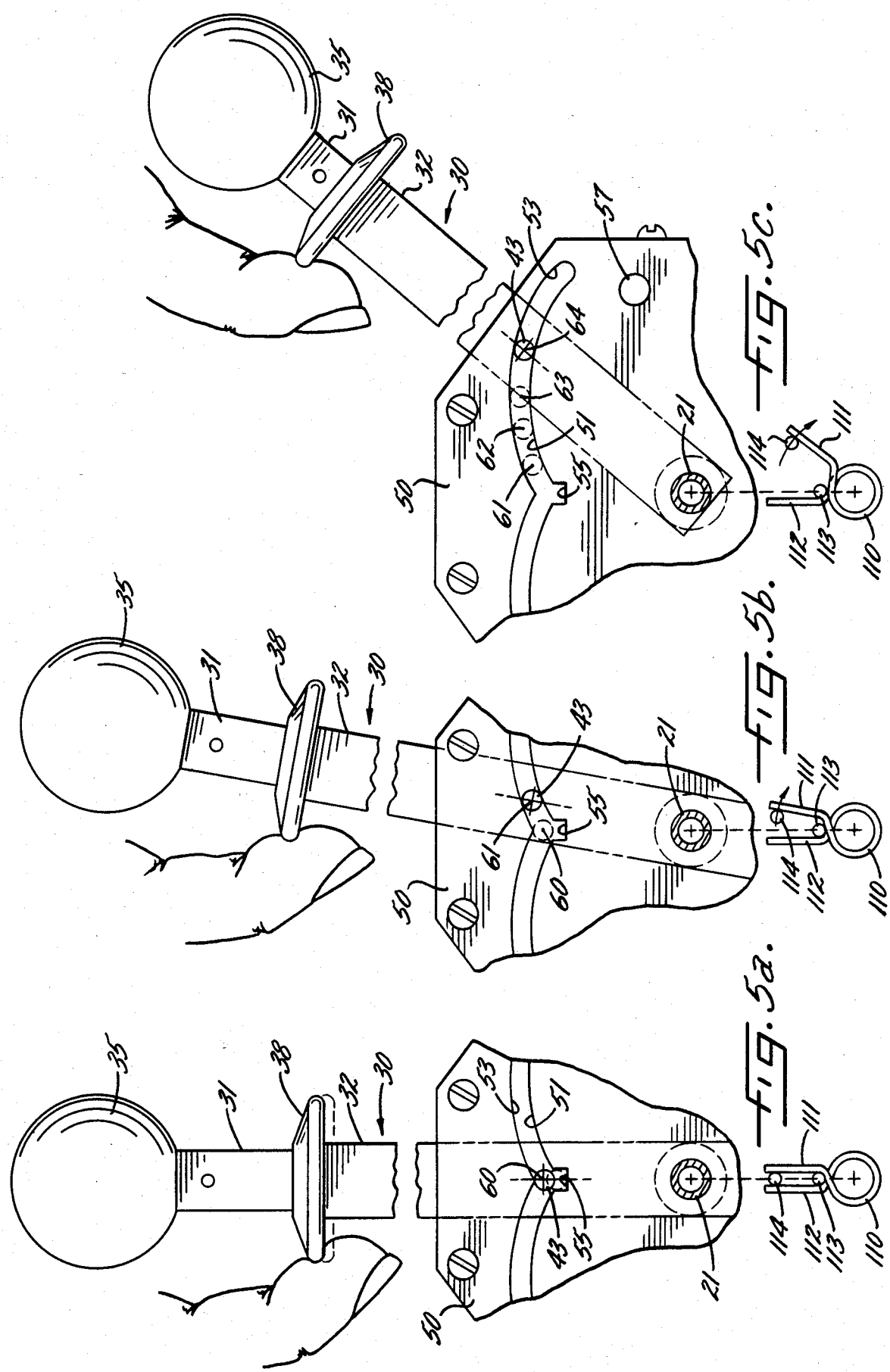

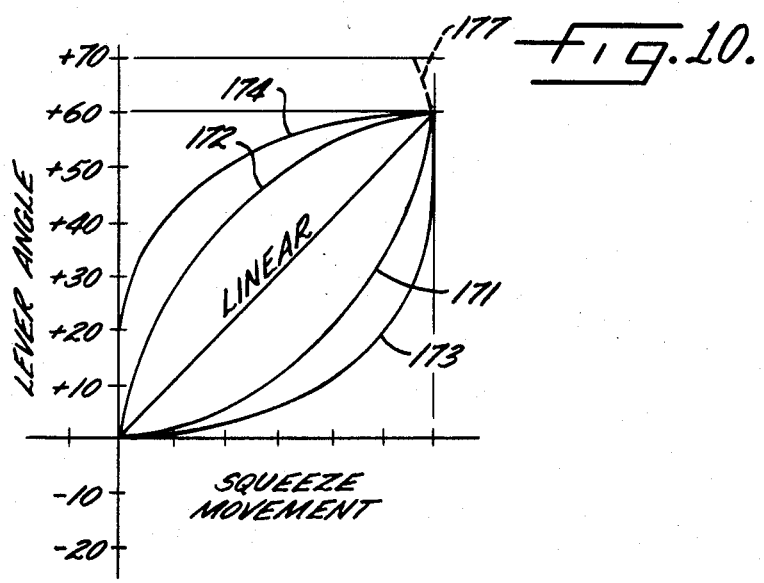
_fig.10._
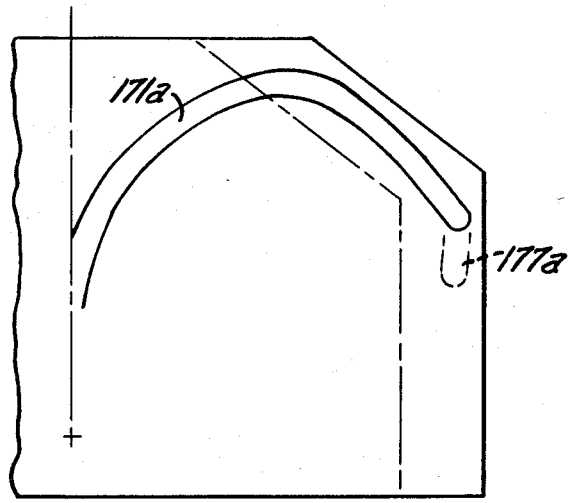
_fig.11._
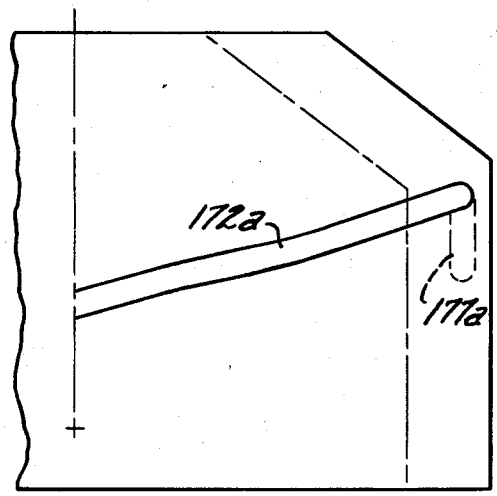
_fig.12._
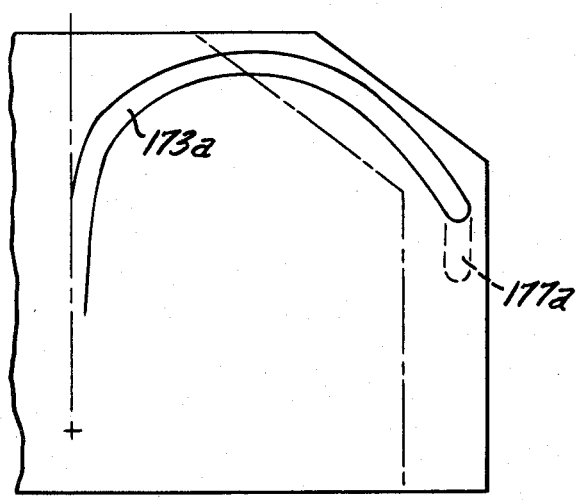
_fig.13._
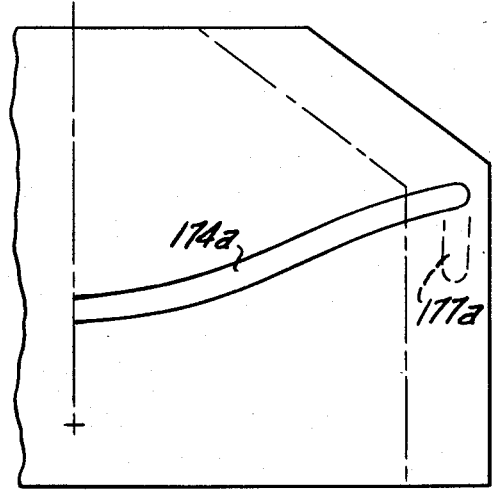
_fig.14._

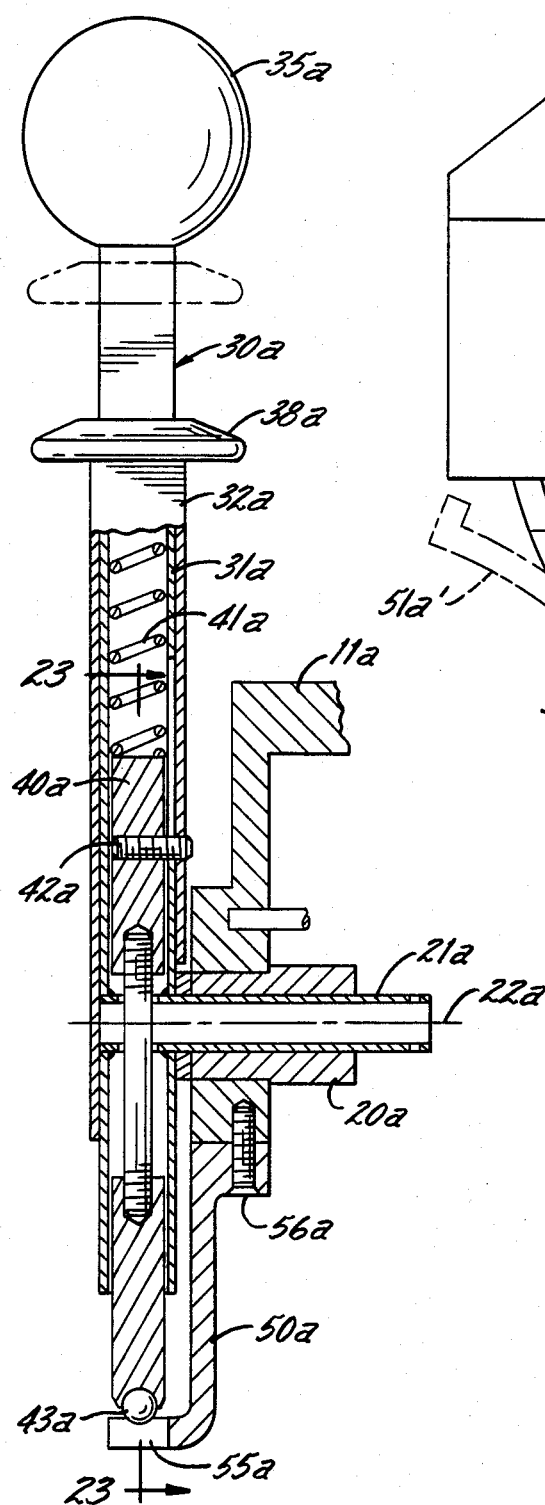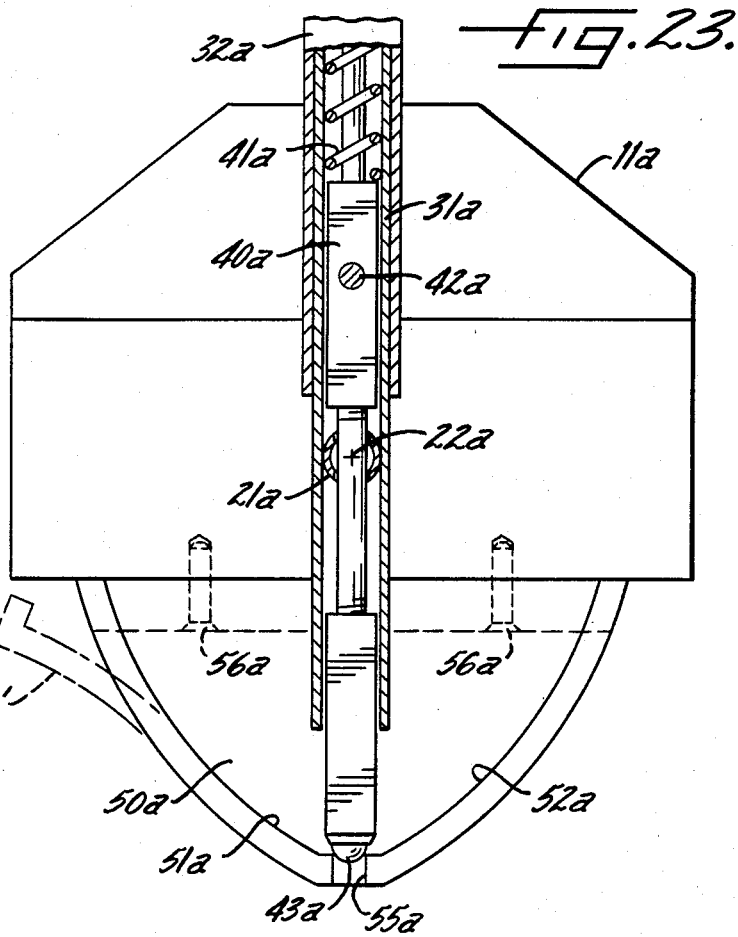

LEVER STROKE CONTROL

In the control of hydraulic valves and the like by a quadrant lever there are two main requirements, ease and precision of angular adjustment and a programable output characteristic. By precision of adjustment is meant that it should be possible for the operator to advance the quadrant lever to a prescribed position at a prescribed rate to bring about the desired result. Where the quadrant lever is used to control the operations of a machine tool, crane, earth moving excavator and the like a high degree of skill is required to manipulate a quadrant lever in such a way as to bring about the desired result without risk to the equipment or the endangering of other personnel.

Even with a skilled operator precise control is hard to achieve where the operator, as in the case of a crane or earth moving device, works in a cab which itself moves and which may be subject to external reaction forces. For example, where the digger of an excavator strikes a rock or other obstruction the cab may be severely jolted, throwing the weight of the operator against the lever at best disrupting the operator's delicate touch and at worst causing the control to run wild. Such accidental bumping can occur wherever a quadrant lever is employed for control purposes and where the control movement is wholly dependent upon the gross movement of the hand or arm of the operator.

A second requirement of a satisfactory quadrant lever control is that it be capable of being programmed, that is, capable of producing an output signal which varies as a predetermined and highly specialized function of the degree of throw of the lever. For example, where a quadrant lever is used to control an hydraulic valve, the slope of the control characteristic should preferably be high in the region of the origin, or reference position, resulting in a preliminary rapid movement of the valve spool to the control threshold, that is, the point where the hydraulic port begins to be uncovered. Similarly, where the function being performed must be precise over the central portion of the control range but may undergo gross change as the end of the range is approached, a greater slope in the control characteristic is called for toward the end of the range. Further, specialized uses of a quadrant lever type of control can require that the characteristic include a step function at one or more positions in the control range. Changes in the slope and well defined steps in the control characteristic are difficult to achieve using mechanical expedients such as cams or electric transducers such as specially wound potentiometers.

It is, accordingly, an object of the present invention to provide a manual controller of the type employing a quadrant lever which achieves highly precise control without requiring a highly skilled operator, which is substantially immune against jarring and bodily movement of the operator, and which is susceptible to programming of the output signal in accordance with any desired nonlinear or step function.

It is another object of the invention to provide a manual controller of the quadrant lever type which does not rely upon gross movements of the hand, the arm or the body of the operator but in which the position of the lever is determined primarily by the squeezing movement of the operator's fingers on the controlling hand resulting in a control function having a high order of delicacy and positional sensitivity. Such delicacy and sensitivity is preserved even where the control station is in a cab which is subject to unexpected jerky movements.

It is another object of the invention to provide a manual controller of the quadrant lever type in which the "throw" of the lever to cover a control range from minimum to maximum may be much greater than in quadrant levers of the type normally available. The throw may, for example, be up to 180° or, alternatively, reduced to only a few degrees, if that be desirable.

It is still another object of the invention to provide a manual controller of the quadrant lever type in which both the squeeze control characteristic and output characteristic may be separately programmed thereby adapting the controller to an infinitely wide range of uses including highly specialized control applications, resulting in a controller having universal utility.

It is yet another object of the present invention to provide a controller capable of precise control but which does not require a high level of skill or experience, a controller which may be operated to perform the most exacting tasks for long periods of time comfortably and without strain or fatigue on the part of the operator.

In one of the aspects of the present invention it is an object to provide a manual controller in the form of a quadrant lever movable from a central or reference position in opposite directions and in which the squeeze control characteristic and the characteristic of the output signal may be programmed differently for the opposite directions of lever movement. Indeed, it is an object to provide a controller in which the squeeze characteristic may be changed by the simple expedient of removing a couple of screws and changing a cam plate arranged adjacent the lever. In accordance with a related aspect of the invention the output signal characteristic may be similarly changed by the simple expedient of removing a pin and replacing a drum on the lever shaft.

Notwithstanding the numerous operational and functional features of the control, it is an object to produce a control which eliminates the need for intermediate gearing or linkage, which may be economically constructed of simply formed parts, which does not require exercise of a high degree of precision during manufacture, which is easily assembled and maintained, and which is free of wear and can be expected to last indefinitely even in exposed conditions of hard service.

Other objects and advantages of the invention will become apparent upon reading the attached detailed description and upon reference to the drawings in which:

FIG. 1 is a vertical section taken through a manual controller embodying the present invention looking along line 1—1 in FIG. 2.

FIG. 1a shows a cross section taken through the quadrant lever along line 1a–1a in FIG. 1.

FIG. 2 is a transaxial section taken along line 2—2 in FIG. 1.

FIG. 3 is a similar section looking along the line 3—3 of FIG. 1 and showing the face of the cam plate.

FIG. 4 is a right-hand side view of the device with cover plate removed looking along line 4—4 in FIG. 1.

FIGS. 5a, 5b and 5c are a series of stop motion views based upon FIG. 3.

FIG. 7 is a fragmentary face view of a tube carrier as viewed along line 7—7 in FIG. 4.

FIG. 8 is a developed view of the drum surface viewed inwardly along line 8—8 in FIG. 4 and showing the profiles of the extensive magnets.

FIGS. 9A and 9B are rudimentary circuit diagrams for converting degree of saturation to a usable output signal.

FIG. 10 is a plot of lever angle versus plunger movement for linear and nonlinear conditions.

FIGS. 11–14 show the cam profiles corresponding to the nonlinear conditions illustrated in FIG. 10.

FIG. 22 is a view similar to FIG. 1 showing a modified structure in which the cam track is in the plane of the lever and on the opposite side of the rocking axis.

FIG. 23 is a fragmentary section taken along line 23 in FIG. 22.

Figure 6:
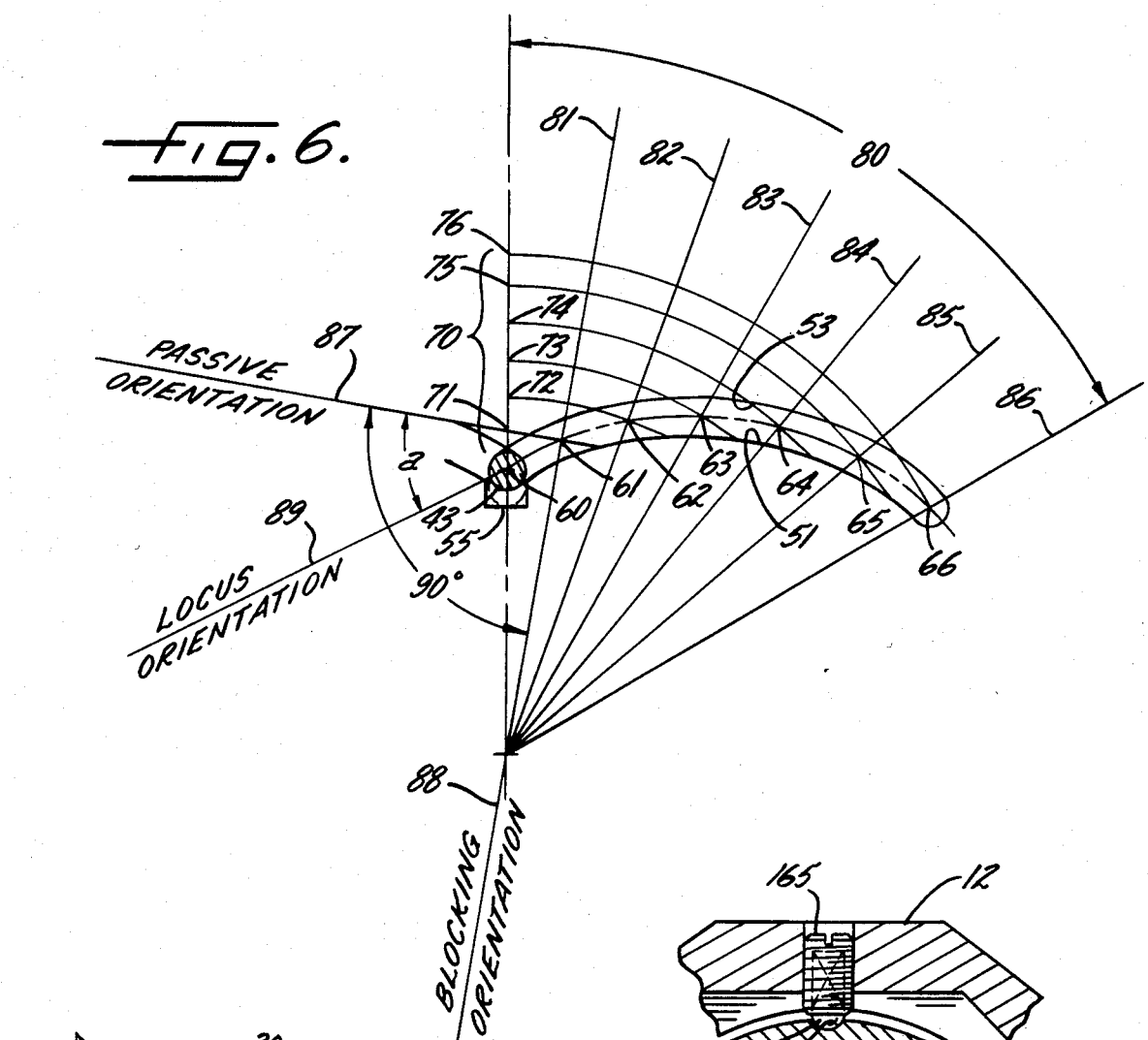
FIG. 6 is a diagram showing the development of a typical cam track employed in the present invention providing substantially linear squeeze control.

While the invention has been described in connection with certain preferred embodiments, it will be understood that there is no intention to limit the invention to the particular embodiments which have been illustrated, but it is intended, on the contrary, to cover the various alternative and equivalent forms of the invention included within the spirit and scope of the appended claims.

Turning now to the drawings there is shown a quadrant lever type of controller 10 having a frame in the form of a hollow shell or housing 11 with a gabled top surface 12, end walls 13, 14 and a front wall 15 defining a central space 16. This space is enclosed by a cover plate 17 secured by small machine screws 18.

Mounted in the wall 15 of the housing 11 is a hollow cylindrical bushing 20. Journalled on the bushing is a hollow shaft 21 having an axis 22.

Secured to the shaft is a composite quadrant lever 30 consisting of an inner tubular element 31 and an outer tubular element 32 which are telescoped together, the inner tube being secured at 33 to the shaft by brazing or the like, so that the inner tube carries the outer one in the course of its back and forth movement.

At its upper end the inner tube 31 mounts a palm rest 35 in the form of a ball of plastic or the like which is screwed onto a stud 36 which is anchored in the inner tube by means of a cross pin 37. At the upper end of the outer tube 32 there is a finger grip 38 in the form of an annular enlargement and which has a normal position such that the degree of spread between the palm rest and finger grip is within a range which enables the fingers of the operator to engage the finger grip while the palm of the hand rests upon the palm rest.

Slidably mounted within the inner tube 31 is a sliding plug 40 which is pressed downwardly by means of a compression type coil spring 41. Screwed into the side of the plug is a laterally extending pin 42 having a projecting tip 43 which serves, as will be seen, as a cam follower. The pin is received in, and extends through, an opening 44 formed in the outer tube. A longitudinal clearance slot 45 formed in the inner tube permits longitudinal movement of the pin. The slot 45 has a bottom end 46 which serves as a limit stop. The spring 41, pressing down upon the sliding plug 40, bottoms the pin 42 and thereby determines the condition of maximum spread between the palm rest 35 and finger grip 38. When the hand of the operator, indicated at H in FIG. 3, is placed with the palm on the ball 35, the fingers in a natural grasping position engage and curl upon the finger grip 38 so that, with squeezing motion, the finger grip 38 can be elevated progressively to an upraised limit position 38'. Such squeezing motion causes the outer tube to pull upwardly upon the pin 42 which raises the sliding plug 40 against the restoring force of the compression spring 41.

In carrying out the invention a stationary cam plate 50 (FIG. 3) is provided presenting a cam track consisting of a first portion 51 and a second portion 52 having respectively opposed walls 53, 54 and a central or reference position 55. The cam follower 43 extends between the walls and perpendicularly to the plane of swinging movement of the lever. The cam plate is secured in position by screws 56. Stops 57, 58 at the ends of the cam track limit the stroke.

In accordance with the invention the cam track is so contoured that upon movement of the lever from its reference position the cam follower 43 is yieldingly obstructed by the cam track so that progressive free movement of the lever must be accompanied by progressive squeezing movement of the hand of the operator, with the result that the squeezing movement controls the progress of rocking movement.

This required coordination between the squeezing movement of the hand and the rocking movement of the lever will be apparent upon consideration of FIGS. 3–6. FIGS. 3 and 5a show the lever in its vertical or reference position. Let us assume that it is desired to produce a control signal by rocking the lever backwardly. With the cam follower occupying the central position 60, the lever is effectively blocked. However, upon applying squeezing movement between the fingers and the palm of the hand, overcoming the force of the coil spring 41, the cam follower 43 is progressively raised to position 61, and, during this progressive raising movement, the lever may be freely rocked rearwardly (to the right) through a corresponding angle. However, if it is desired to increase this angle by pulling the lever further back, the lever offers substantial resistance and cannot be freely moved to its next position 62 without additional squeezing movement between the palm and fingers. Similarly, the lever cannot be moved beyond the position 62 to the position 63 without further squeezing movement, and this applies to the end of stroke, until the stop 57 is encountered by the lever.

In short, the squeezing movement "gives permission" on a constant and progressive basis for the angular swinging movement of the lever. The lever can only be swung rearwardly as long as swing is accompanied by progressive squeezing.

This is not to say that the lever cannot be moved rearwardly with application of brute force. Such rearward movement, without application of squeezing force, will, in the illustrated embodiment, result in upward movement of the cam follower as it is cammed upwardly by engagement with the cam track 51 accompanied by progressive compression of the spring 41. However, this is a non-intended mode of operation the operator will recognize immediately by reason of the amount of force required to move the lever. The operator quickly learns that unobstructed swinging movement of the lever is only brought about by coordinating the squeezing movement with the gross arcuate movement. In short, since the squeezing movement is the more precise it has effective control over the gross movement of the hand, arm or body relied upon in the operation of conventional control levers of the quadrant type.

One geometric procedure which may be used to plot the cam profile to achieve a substantially linear relation between lever angle and squeezing movement is set forth in FIG. 6. In this diagram, which is plotted to double scale, the total range of movement of the finger grip 38, and hence of the cam follower 43, is indicated at 70. This is divided into equal increments 71–76. The available rearward swing of the lever, indicated at 80, and which is, in the present instance, 60°, is similarly divided into equal increments 81–86. Arcs are swung from the points 71–76 at radii which, at intersection with similarly incremented angular rays, define intersections 61–66 respectively which, upon being smoothly interconnected, define the cam follower locus. The walls 51, 53 of the cam track are spaced equidistant from the locus in straddling relation to the cam follower.

It will be noted by one skilled in the art, following the above procedure, that the actual orientation of the locus at each point therealong lies at a substantially constant angle between lines of passive orientation and blocking orientation. The line of passive orientation is that along which the cam follower can proceed incrementally at a constant radius without obstruction as indicated at 87 in FIG. 6. The line of blocking orientation is indicated at 88 in the same figure and is that along which obstruction to the incremental movement of the cam follower would be maximum, the two limiting orientations being at 90° with respect to one another. The actual orientation of the locus at point 61, and which is indicated at 89, lies between the two limits and is, in the present example, as an angle a of approximately 30° from the passive condition. A similar angle a exists at each of the succeeding points 62–66 inclusive. The result is the linear relationship of lever angle to squeeze which is set forth in FIG. 10, although, as will be seen, the invention is not limited to this substantially linear relationship.

While the cam locus has been developed, in FIG. 6, for movement of the lever only in one direction from the reference position, it will be apparent to one skilled in the art that a similar profile may be constructed, in mirror image, for movement of the lever in the opposite, or forward, direction.

In accordance with one of the important aspects of the present invention, the controller includes a drum coupled to the shaft with a magnetically saturable tube mounted on the frame and spaced from and parallel to the drum axis, with an extensive permanent magnet mounted on the surface of the drum and having a helically arranged edge so that as the quadrant lever is rocked there is a progressive change in the portion of the tube which is magnetically saturated by the magnet.

Thus, referring particularly to FIGS. 1, 2 and 4 there is provided, at the end of the shaft 21, and mounted within the housing 11, a drum 100 which may, for example, be made of aluminum and which is of hollow cup shape, having a cylindrical surface 101 and an end wall 102 defining a hub 103. Penetrating the shaft 21 and hub 103 is a cross pin 104 ensuring that the drum shall move precisely in step with the lever.

For the purpose of maintaining the lever and drum normally in a reference position, a centering spring 110 is provided surrounding the bushing 20 and which has straight radially extending ends 111, 112. The ends of the spring embrace, between them, a first pin 113 connected to the frame and a second pin 114 which is anchored in the drum, the pins extending parallel to one another in the axial direction. The effect of the spring is to bias the pins into radial alignment with one another thereby biasing the quadrant lever and drum into a reference relationship. As set forth in the stop motion views, FIGS. 5a–5c, rocking movement of the quadrant lever stresses the spring and results in a center-restoring torque, with the spring rate being dependent upon the strength and length of the spring being used.

For the purpose of producing an electrical control signal which depends upon the direction and amount of angular movement of the lever, a pair of magnetically saturable tubes 121, 122 are provided. These are secured to carriers 123, 124, respectively, which are fastened to the inner end walls 13, 14 of the housing by means of screws 125, 126, the tubes being arranged parallel to one another and to the drum axis and spaced a short distance from the surface of the drum. For cooperating with the tubes a pair of extensive magnets 131, 132 (FIG. 8) are cemented to the surface of the drum, the magnets being arranged in mirror-image relation and of generally triangular shape so as to provide respective angled edges 133, 134, respectively, which, by reason of their securement to a cylindrical surface, lie along a helical locus. The magnets are so spaced that each magnet spans one half of the length of its adjacent tube when the lever is in reference position so that rocking of the drum by the lever away from reference position results in progressive differential saturation of the tubes in a sense which depends upon the direction of the quadrant lever movement. By "mirror image" is meant simply that the magnets are arranged either point-to-point or base-to-base. The magnets are preferably polarized in the "thickness" mode, but the entire presented surface of each of the magnets need not be of the same polarity.

The magnetic material used for the magnets 131, 132 is a staple of commerce consisting of a flexible plastic which has been loaded with particles of barium ferrite or equivalent. The material comes in various thicknesses and may be cut to a desired shape following which it may be permanently magnetized. The material is available as a staple of commerce from a number of different sources including 3M Company, Industrial Electrical Products Division, 3M Center, St. Paul, Minn. 55101 or from Bunting Magnetics Co., 500 South Spencer Avenue, Newton, Kans. 67114. The ferrite tubes per se, also a staple of commerce, may be obtained from Indiana General, Valparaiso, Ind. 46383, Stackpole Company, St. Mary's, Pa. 15857, or Ceramic Magnetics Inc., Fairfield, N.J. 07006.

For the purpose of producing an output signal which varies in magnitude and direction as the drum is rocked in either direction from its reference position, a sensing circuit of the type set forth in FIG. 9A may be used.

The saturable tubes 121, 122 are threaded with one or more "pickup" turns 141, 142 which sense the degree of saturation of the tubes 121, 122. An oscillator 143 generates an excitation signal of about one kilohertz which is coupled to the pickup turns 141, 142 by a capacitor 144. As shown, the excitation $V_{in}$ is applied across the pickup turns 141, 142 connected in series with respect to ground. An output signal $V_{out}$ appears at the midpoint or tap 145 connecting the pickup turns 141, 142. Since the pickup turns 141, 142 constitute the two impedances of a voltage divider, the output and excitation signals are related to the fractional inductance α (of the lower tube 122) and the non-saturated self-inductance L according to:

$$\frac{V_{out}}{V_{in}} = \frac{\alpha L}{\alpha L + (1-\alpha)L} = \alpha$$

The fractional inductance α is one-half for the middle positon of the magnets 131, 132 as shown. The self-inductance of the lower tube 122 is αL and the self-inductance of the upper tube 121 is (1−α)L. Hence, the amplitude of the output signal $V_{out}$ is a linear function of the fractional inductance α and thus the difference in saturation of the tubes.

In order to generate a DC electrical control signal $V_{out}'$ from the AC output signal $V_{out}$, an AC signal detector 146 generates a DC signal proportional to AC amplitude. A directional diode, for example, may be used, although more precise amplitude or peak detectors are available as integrated circuits. A signal conditioning chip, Part No. 80330057 manufactured by Interdesign Corp., is especially useful since it includes an oscillator as well as a peak detector. A demodulation or low-pass filter capacitor 147 shunts the AC signal detector 146 output to ground.

In order to independently adjust the span or range of DC signal $V_{out}'$ for a given position deviation of the magnets 131, 132 and the zero point of the DC signal $V_{out}'$, a buffer amplifier 148 is provided having independent gain and offset controls 149, 150, respectively. The gain of the operational amplifier 148 is set by the resistance ratio of the adjustable resistor 149 and a series input resistor 151. The potentiometer 150 selects the zero or bias point of the amplifier 148 as a point between the positive +V and negative −V supply voltages.

During an initial calibration step, the span adjust control 149 is set midrange and the magnets 131, 132 are placed in the desired center reference position. Then the zero adjust control 150 is adjusted to obtain a zero output voltage $V_{out}'$ with respect to ground. Finally, the magnets 131, 132 are moved to a full-scale position, and the span adjust control 149 is adjusted for the desired full-scale voltage $V_{out}'$ with respect to ground.

In FIG. 9A the saturable tubes are wired as inductors with single pickup coils 121, 122 to sense differential self-inductance. Alternatively, as shown in FIG. 9B, secondary coils 152, 153, respectively, may be wound to sense the differential mutual inductance of the tubes. In this manner, the saturable tubes 121, 122 and coils 141, 142, 152, 153 comprise a differential transformer which generates a balanced output signal $V_{out}''$. The amplitude of the balanced output $V_{out}''$ is proportional to the distance of the magnets 131, 132 from the center reference position, while the phase or polarity of the output signal $V_{out}''$ is indicative of the particular direction from the center reference position. The differential connection of FIG. 9B has noise and interference rejection advantages over the single-ended connection of FIG. 9A, but it requires a balanced product detector (e.g., diode ring or switching demodulator such as IC Part No. 4016) for the AC signal detector 146 in order to compare the phase of the AC output signal $V_{out}''$ to the phase of the oscillator 143 output. But the balanced circuit of FIG. 9B is conveniently used as a remote position sensor since a shielded twisted pair signal cable 154 provides excellent isolation from external electromagnetic interference.

Figure 19:
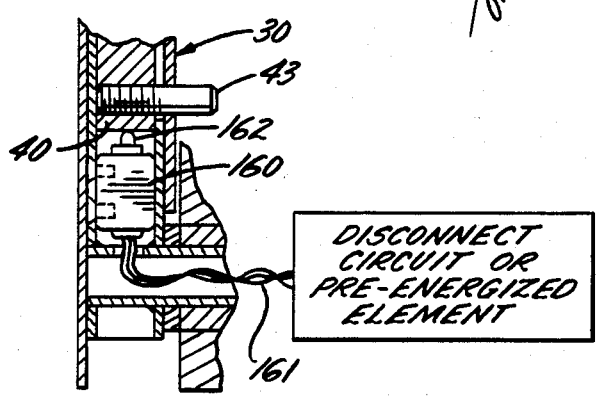
FIG. 19 is a fragment based upon FIG. 1 but showing installation of a normally closed switch within the quadrant lever.

As a further precaution against inadvertently knocking the quadrant lever out of its reference position a notch may be provided at the reference position where the two portions of the cam track meet. Such notch, indicated at 55 in FIGS. 3, 5 and 6, is sufficiently wide to receive the cam follower, which is pressed into the notch by the spring 41. The notch is, however, of such shallow depth that the cam follower is freed from the notch by the initial relative movement of the inner and outer elements of the lever upon application of squeezing force. In accordance with one of the aspects of the present invention a switch is provided on the lever having an actuator arranged for response to the initial slight relative movement which occurs upon lifting the follower from the notch and which is utilized either to secure disconnection of the electrical circuitry for safety purposes or to secure preenergization of a power supply device. If desired a switch of miniaturized construction may be seated in the central tube of the lever as shown at 160 in FIG. 19, with output leads 161 exiting through the shaft of the lever. The switch has an upwardly biased plunger type actuator 162 which is in contact with the plug 40. It is preferably of the normally-closed type so that when the plug 40 is in its lowered, at rest position, the plunger 162 is depressed to open the switch contacts, thereby to disable the associated control circuitry.

The switch 160 may also be utilized for pre-energization of a portion of the system. For example, where the controller is utilized for opening of an hydraulic valve supplied by a pump which is in turn driven by a prime mover (not shown), the switch 160 may be used to make a step change in the position of the throttle or speed controller of the prime mover so that it will be able to handle the power demand shortly to be placed upon it without faltering or choking down. If desired, the switch may be employed simultaneously for both of the above-mentioned purposes.

Figure 21:
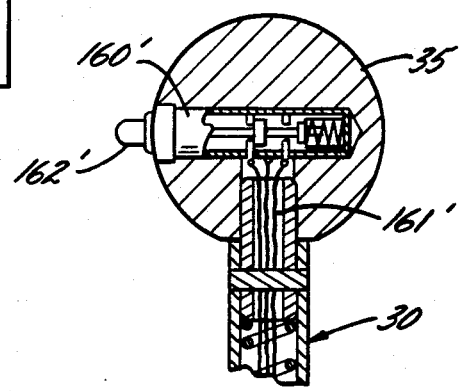
FIG. 21 is a fragment based upon FIG. 1 showing use of a switch in the palm rest.

As an alternative, to provide additional versatility in the control function, a switch, for example, of the singlepole, double-throw type may be incorporated in the palm rest 35 for convenient manipulation by the thumb. Such switch, indicated as 160' (see FIG. 21, also FIG. 3) has leads 161' and a push button 162'.

In a typical operation, then, referring to FIG. 5a, squeezing force is applied to the finger grip 38 to cause the cam follower 43 to clear the notch 55. This initial squeezing movement, which takes place prior to any rocking movement of the lever, suffices to actuate the switch 160 placing the circuitry in readiness to receive a command and, if desired, acting upon a pre-energized element such as an engine throttle. The lever is then rocked in one direction or the other accompanied by squeezing movement to produce progressive rocking of the drum to produce an output signal which varies in polarity and magnitude in accordance with movement of the drum from reference position. The movement of the lever, and the squeezing movement which controls the lever movement, is continued until the desired output signal is achieved or until the lever reaches the end of its rocking stroke. In the event that squeezing force is applied in excess of that required to free the lever for incremental movement, the cam follower will simply engage the opposite or "upper" wall of the cam track so that the lever tends to be propelled in a direction away from the reference position by the squeezing force.

As stated, it is difficult to hold a conventional quadrant lever steady in a desired position. Reliance is placed upon the gross movement of the hand or arm which cannot be controlled with precision. Even where it is the intention of the operator to hold his hand still, the bodily movement of the operator, or any jarring movement, particularly of an unexpected nature as may occur in a movable control cab, will cause non-intended movement of the quadrant lever with perhaps serious consequences. By contrast, when using the present controller, in which the lever position is determined by the applied squeezing force, the angle of the lever may be held more nearly constant.

When it is desired to restore the quadrant lever to its reference, or off, position, the squeezing force is gradually released as the lever is permitted to return in the reverse or centering direction. On the return stroke the energy which has been stored in the coil spring 41 is released so that the lever actually searches out its reference position.

This particular tendency of the lever to return to its reference position from over a substantial range of lever positions is due to the resilient engagement of the cam follower 43 and the cooperating cam surfaces 51, 52 and is in addition to the returning tendency of the centering spring 110. The returning tendency due to the resilient engagement of the cam and cam follower is an increasing function of the bias of the coil spring 41 and the slope of the cam surfaces 51, 52 towards the center reference position (in terms of the change in the radius of the cam profile at the location of the cam follower 43 per the change in angular position of the lever). As shown in the drawings, the abrupt notch in the cam profile at the center position 55 provides a uniform and positive return to the reference position whereas the centering spring 110 is a good deal less uniform and positive as to its final position. Moreover, the centering spring 110 has a return force which is a rather constant increasing function over the full stroke of the lever outside the centering spring's "dead zone" near the reference position, while in contrast the cam surfaces 51, 52 can be shaped for a desired return force pattern. For a cam profile with sufficient slope, the cam profile alone will return the lever to its reference position and the return spring 100 may be unnecessary. It should be noted, however, that an arbitrary cam profile may give rise to objectionable movements of the finger grip 38 since the finger grip is connected to the cam follower 43. In this case, it will become apparent to one skilled in the art that a second cam follower and a second cam profile could be provided for the specific purpose of obtaining a desired return force pattern. The second cam follower and cam profile, for example, could be diametrically opposite the cam follower 43 and cam surfaces 51, 52 to obtain a design radially symmetric with respect to the shaft axis 22.

Figure 20:
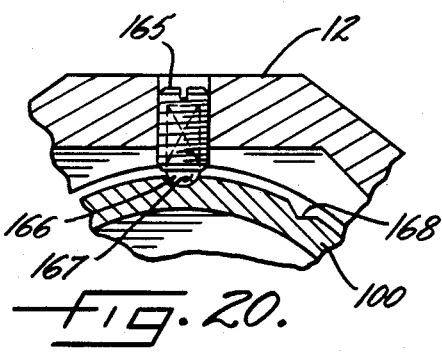
FIG. 20 is a fragment, based on FIG. 4, showing use of a ball detent biased into a recess in the drum to define precise positions of the lever and drum.

For the purpose of signalling to the operator that the reference position has been achieved, a ball type, springpressed detent may be mounted in the top wall of the housing as indicated at 165 in FIG. 20, with the ball 166 thereof cooperating with a recess or dimple 167 machined in the cylindrical surface of the drum. The clicking of the ball into the recess is readily sensed by the operator so that he knows with assurance that he is at the reference position. Additional dimples 168 may be formed in the drum 100 in a spaced series enabling the operator to move quickly and confidently to successive positions of predetermined single level. It will be apparent to one skilled in the art that the motion of the lever may be detented by detents elsewhere in the system as, for example, interposed between the inner and outer elements 31, 32 of the quadrant lever or simply by forming notches in the cam surfaces 51, 52.

Because of the wide range of angular "throw" permitted by the present construction, in the illustrated embodiment a total of 60° each way from the reference position, the ratio of lever movement to the change in the controlled condition is maximized providing a control which is easy and comfortable to use and which is not at all "touchy". Nevertheless, the present control is not limited to the large lever angle and the angle may be made as small as desired, for specific applications, simply by using shorter magnets while maintaining their original maximum width.

In this connection it is one of the features of the present invention that it is not limited to use of magnets of triangular shape but equally useful with magnets of special contour including steps for providing any programmed control characteristic which may be desired. For a fuller understanding of the manner in which the magnets may be tailored to produce predetermined characteristic output curves, reference is made to my co-pending application Ser. No. 470,165, filed Feb. 28, 1983, the disclosure of which is included herein by reference.

While the invention has been described above in connection with an embodiment in which the lever angle is substantially linearly related to the squeezing movement, the invention is by no means limited thereto and the profile of the cam track may be appropriately modified to produce almost any desired nonlinear relationship. Four examples of nonlinearity are set forth in FIG. 10. It may be desired, for example, for certain control purposes, to increase the ratio of squeezing movement to the lever angle to increase the degree of squeeze control in the region of the origin as represented by the characteristic 171 in FIG. 10. Such characteristic can be achieved by a cam track profile as set forth at 171a in FIG. 11.

Conversely, it may be desired to increase the relative effectiveness of the squeezing movement toward the end of the stroke of the lever. This is represented by the characteristic 172 and may correspond to the profile of cam track illustrated at 172a in FIG. 12.

Carrying the characteristic 171 one step further, it may, for some purposes, be desired to concentrate the controlling effect of squeeze over the early portion of the stroke while causing the lever to move freely and passively without squeeze control over the latter portion of the stroke. Such possibility is represented by the characteristic 173 corresponding to the cam profile 173a illustrated in FIG. 13.

Conversely, it may be desired to have passivity during the early movement of the lever with squeeze control concentrated over the terminal portion of the stroke as represented by the characteristic 174, corresponding to the cam track profile 174a shown in FIG. 14.

In the examples discussed above the control, apart from the passive condition, requires application of increased squeezing force to achieve greater throw, this being achieved by use of a cam track, the radius of which, with respect to the rocking axis, and at a transition point, increases with the angle of lever displacement. For some applications it may be desirable at a certain point in the stroke of the control lever, for example, as the end of the stroke is approached, for the squeezing force to be reduced for increased lever displacement. This results in a condition of self-acutation in which the lever, once the transition point has been traversed, tends to maintain its position until intentionally retracted. Preferably under such circumstances the "squeeze" spring 41 is chosen to have a high reaction force while the centering spring is limber with a low spring rate.

An example of a self-activating characteristic utilized at the end of the stroke is shown as 177 in FIG. 10, being brought about by forming the terminal portion of the cam track as set forth at 177a in FIGS. 11-14. The self-actuating characteristic is useful in establishing the "float" position of an hydraulic spool valve in which position the valve connects both sides of an hydraulic cylinder piston to tank, or atmosphere, so that the piston is free to move or "float" as might be desirable in the control of a snow plow blade. The operator can therefore simply "flip" the controller beyond the transition point into the "float" position and leave it there for a prolonged period while plowing snow, the plow blade being free to float on the road surface.

Figure 15:
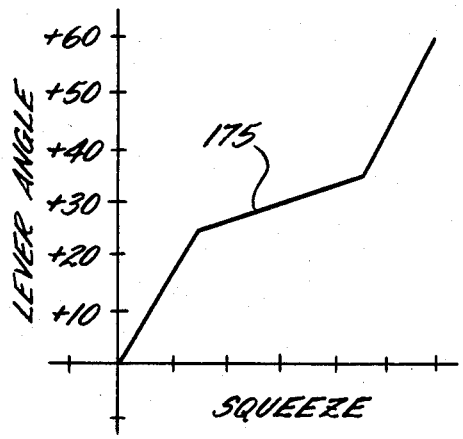
FIG. 15 is a plot similar to FIG. 10 but illustrating increased sensitivity of squeeze control around the origin.
Figure 16:
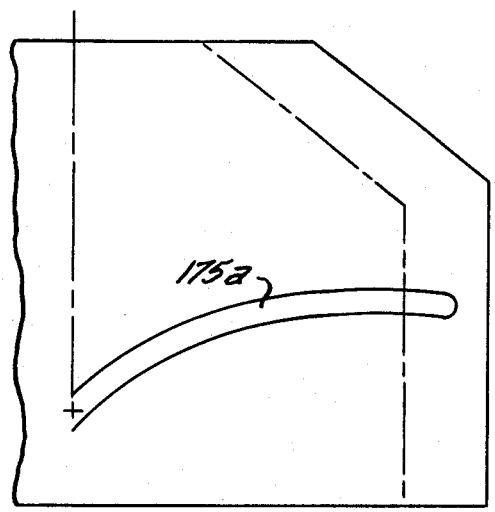
FIG. 16 shows a cam profile corresponding to FIG. 15.
Figure 17:
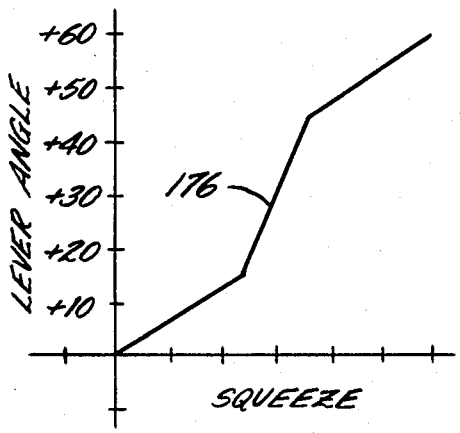
FIG. 17 is a further plot illustrating sensitivity of squeeze control at the end portions of a lever stroke.
Figure 18:
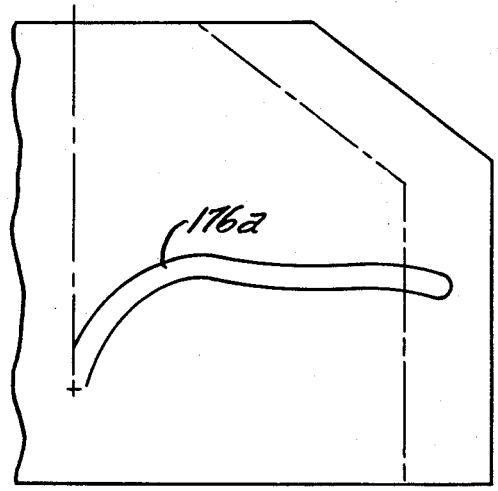
FIG. 18 shows the cam profile corresponding to FIG. 17.

As a further alternative, it may be desired for certain control purposes to concentrate the squeeze control at the central portion of the lever stroke corresponding to the characteristic 175 set forth in FIG. 15, which can be accomplished by profiling the cam track as shown at 175a in FIG. 16. Or, if desired, the squeeze control effect may be concentrated both near the reference position and near the end of the stroke of the lever as represented by the characteristic 176 in FIG. 17 and which may be achieved by the profile 176a in FIG. 18. The modifications set forth in FIGS. 15-18 are distinguished by their stepped shape, and it will be apparent that steps may be incorporated in the squeeze control characteristic at any position and to any degree depending simply upon the choice of the designer.

Because of the versatility brought about by the use of different profiles of cam track, some of which have been listed above, it is one of the practical features of the present construction that the cam plate 50 which is shown in section in FIG. 1 and in profile in FIG. 3 may be made removable using screws 56 so as to permit quick and easy substitution of some alternate cam track profile required to perform a particular control function. Moreover, if desired, the cam plate may be furnished in separate right and left-hand sections, with the cam tracks thereon in mirror image symmetry or with the cam track specialized and non-symmetrical.

In the above embodiment of the invention the cam track, consisting of portions 51, 52, is on the same side of the rocking axis 22 as the quadrant member 30. It is one of the features of the present invention that the cam track may be positioned on the opposite side of the axis, that is, the cam track may be below the rocking axis while the quandrant lever is above. Such an arrangement is illustrated in FIGS. 22 and 23 in which similar reference numerals have been used to designate corresponding parts, with addition of subscript a.

In this modification of the invention the housing 11a which has only been partially shown, mounts a bushing 20a which supports a shaft 21a defining a rocking axis 22a. Secured to the shaft is a composite quandrant lever 30a made up of an inner tubular element 31a and an outer tubular element 32a to which are connected a palm rest 35a and finger grip 38a, respectively, the inner element 31a being rigidly secured to the end of the shaft.

Slideably mounted within the inner element is a plug or plunger 40a which is downwardly pressed by means of a coiled spring 41a. The plug is connected to the outer tubular element 32a by a pin 42a.

The plug or plunger carries a cam follower 43a at its lower end, extending from the path of swinging movement of the lever into engagement with a cam track on a stationary cam member 50a. As shown in FIG. 23 the cam track consists of first and second portions 51a, 52a which are contoured so that in at least a portion of the arc of movement of the lever from its reference position 55a, the cam track is at a decreasing radius so that the cam follower is yieldingly obstructed by the cam track and so that progressive free movement of the lever must be accompanied by progressive squeezing movement of the hand of the operator with the result of the squeezing movement controls the progress of rocking movement, just as in the earlier embodiment.

Also as in the case of the earlier embodiment the control may be "self actuating" by forming the terminal portion of the cam track, indicated at 51a' of increasing radius beyond a point of transition (see FIG. 23) to provide the "floating" action previously described. To facilitate making changes in the squeeze characteristic the cam member 50a is removably attached by screws 56a.

While the term "telescoping" has been employed herein to describe the relationship between the elements 31a, 32a which make up the quadrant lever, and while it is preferred to have one of these elements inside of the other, it will be understood that the latter is not essential to the practice of the invention and that the term "telescoping" is intended, in its broader aspect, to cover two longitudinally extending members which are arranged side by side and which are longitudinally slidable with respect to one another, and guided in this motion, without, however, being contained one within the other. Also while reference has been made to means for producing an output signal in accordance with the magnitude and direction of rocking movement of the lever from reference position, and while it is preferred to utilize this structure to produce an electrical output signal of a type which may be easily utilized by the controlled apparatus, it will be understood that the invention is not limited to use of an electrical output signal and that the term "output signal" as used herein refers to any output signal intended for control and the signal may thus be in the form of mechanical position or any other condition which may be utilized for control purposes.

Moreover, while the device finds optimum application to quadrant levers which are moveable in opposite directions from a reference position to provide output signals in the positive and negative sense, the invention is not limited thereto and is equally applicable to quadrant levers moveable only in one direction from a reference position.

I claim:

1. In a manual controller for producing an output signal in accordance with movement from a reference position, the combination comprising a frame, a quadrant lever formed of first and second elements telescoped together, one of the elements having a shaft providing a rockable connection with the frame for swinging movement with respect to the reference position while the other element is carried thereby, the first element having a palm rest at its outer end, the second element having a cooperating finger grip, means including a spring for relative biasing the elements endwise so that the palm rest and finger grip are spread apart, a stop effectively between such elements for limiting the degree of spread to an amount which enables the fingers of the operator to engage the finger grip while the palm of the hand rests upon the palm rest, a stationary cam member on the frame presenting a cam track arranged parallel to the plane of swinging movement of the lever, the lever having a cam follower secured to the said other element and extending from the path of swinging movement of the lever into engagement with the cam track, the cam track being so contoured that in at least a portion of the arc of movement of the lever from its reference position the cam follower thereon is yieldingly obstructed by the cam track so that progressive free movement of the lever must be accompanied by progressive squeezing movement of the hand of the operator with the result that the squeezing movement controls the progress of rocking movement, and means responsive to the rocking movement of the lever for producing an output signal having a magnitude and direction in accordance with the magnitude and direction of movement of the lever from reference position.

2. In a manual controller for producing an output signal in accordance with movement from a reference position, the combination comprising a frame, a quadrant lever formed of first and second elements telescoped together, one of the elements having a shaft providing a rockable connection with the frame for swinging movement with respect to the reference position while the other element is carried thereby, the first element having a palm rest at its outer end, the second element having a cooperating finger grip, means including a spring for relatively biasing the elements endwise so that the palm rest and finger grip are spread apart, a stop effectively between such elements for limiting the degree of spread to an amount which enables the fingers of the operator to engage the finger grip while the palm of the hand rests upon the palm rest, a stationary cam member on the frame presenting a cam track arranged closely parallel to the plane of swinging movement of the lever, the lever having a cam follower secured to the said other element and extending perpendicular to the plane of swinging movement of the lever into engagement with the cam track, the cam track being so contoured that in at least a portion of the arc of movement of the lever from its reference position the cam follower thereon is yieldingly obstructed by the cam track so that progressive free movement of the lever must be accompanied by progressive squeezing movement of the hand of the operator with the result that the squeezing movement controls the progress of rocking movement, and means responsive to the rocking movement of the lever for producing an output signal having a magnitude and direction in accordance with the magnitude and direction of movement of the lever from reference position.

3. In a manual controller for producing an output signal in accordance with movement from a reference position, the combination comprising a frame, a quadrant lever formed of first and second elements telescoped together, one of the elements having a shaft providing a rockable connection with the frame for swinging movement with respect to the reference position while the other element is carried thereby, the first element having a palm rest at its outer end, the second element having a cooperating finger grip, means including a spring for relatively biasing the elements endwise so that the palm rest and finger grip are spread apart, a stop effectively between such elements for limiting the degree of spread to an amount which enables the fingers of the operator to engage the finger grip while the palm of the hand rests upon the palm rest, a stationary cam member on the frame presenting a cam track arranged closely parallel to the plane of swinging movement of the lever, the lever having a cam follower secured to the said other element and extending perpendicular to the plane of swinging movement of the lever into engagement with the cam track, the cam track being so contoured that in at least a portion of the arc of movement of the lever from its reference position the cam follower thereon is yieldingly obstructed by the cam track so that progressive free movement of the lever must be accompanied by progressive squeezing movement of the hand of the operator with the result that the squeezing movement controls the progress of rocking movement, a drum coupled to the shaft, a tube of magnetically saturable material mounted on the frame and spaced from and parallel to the drum axis, and an extensive permanent magnet mounted on the surface of the drum and having a helically arranged edge so that as the lever is rocked there is a progressive change in the portion of the tube which is magnetically saturated by the magnet, and means including a winding penetrating the tube for generating an output signal in accordance with the degree of saturation of the tube.

4. In a manual controller for producing an output signal in accordance with movement from a reference position, the combination comprising a frame, a quadrant lever formed of first and second elements telescoped together, one of the elements having a shaft providing a rockable connection with the frame for swinging movement in opposite directions from the reference position while the other element is carried thereby, the first element having a palm rest at its outer end, the second element having a cooperating finger grip, means including a spring for relatively biasing the elements endwise so that the palm rest and finger grip are spread apart, a stop effectively between such elements for limiting the degree of spread to an amount which enables the fingers of the operator to engage the finger grip while the palm of the hand rests upon the palm rest, a stationary cam member on the frame presenting a cam track arranged closely parallel to the plane of swinging movement of the lever, the lever having a cam follower secured to the said other element and extending perpendicular to the plane of swinging movement of the lever into engagement with the cam track, the cam track extending in opposite directions from the reference position of the lever and being so contoured that in at least a portion of the arc of movement of the lever from its reference position the cam follower thereon is yieldingly obstructed by the cam track so that progressive free movement of the lever must be accompanied by progressive squeezing movement of the hand of the operator with the result that the squeezing movement controls the progress of rocking movement, a drum secured to the shaft, a pair of magnetically saturable tubes mounted on the frame and arranged parallel to and slightly spaced from the drum, the tubes being separated from one another by a wide angle, a pair of extensive permanent magnets mounted on the drum for cooperating with the respective tubes, each of the magnets being so formed as to have a helically oriented edge and so spaced that each magnet spans one half of the length of its adjacent tube when the lever is in reference position, the magnets being arranged in projected mirror image relation so that rocking of the drum by the lever away from reference position results in progressive differential saturation of the tubes in a sense which depends upon the direction of quadrant lever movement, and means including windings penetrating the respective tubes for producing an electrical control signal which depends upon the direction and amount of angular movement of the lever.

5. The combination as claimed in claim 1 or in claim 2 or in claim 3 or in claim 4 in which the cam surface is so shaped that the squeezing movement is approximately linearly related to the rocking movement.

6. The combination as claimed in claim 1 or in claim 2 or in claim 3 or in claim 4 in which the cam surface is so shaped that the ratio of the squeezing movement to the rocking movement varies thereby to vary the sensitivity of the squeeze control over the stroke of the lever.

7. The combination as claimed in claim 1 or in claim 2 or in claim 3 or in claim 4 in which the cam surface is distributed on both sides of the reference position in substantially mirror image relation.

8. The combination as claimed in claim 1 or in claim 2 or in claim 3 or in claim 4 in which the cam surface is distributed on both sides of the reference position with the surfaces on the two sides being non-symmetrically shaped with respect to one another.

9. The combination as claimed in claim 1 or in claim 2 or in claim 3 or in claim 4, for use with a servo system having a pre-energizable responsive element, which includes a switch on the lever having an actuator arranged for response to the slight relative movement of the inner and outer elements which occurs upon initial application of squeezing pressure.

10. The combination as claimed in claim 1 or in claim 2 or in claim 3 or in claim 4 in which the cam track has a notch at its reference position occupied by the cam follower and into which the cam follower is pressed by the spring to prevent inadvertent movement of the lever from reference position, the notch being of such shallow depth that the cam follower is freed from the notch by the initial relative movement of the inner and outer elements of the lever upon application of squeezing pressure.

11. The combination as claimed in claim 3 or in claim 4 in which the cylinder has a centering mechanism including a centering spring for biasing the drum to a precise reference position.

12. The combination as claimed in claim 1 or in claim 2 or in claim 3 or in claim 4 in which the cam member is in the form of a plate removably secured to the frame so that the cam member may be easily replaced by one having a differently contoured cam track.

13. The combination as claimed in claim 1 or in claim 2 or in claim 3 or in claim 4 in which the cam track has a wall parallel to the cam surface and spaced with respect thereto so as to closely straddle the cam follower so that upon application of additional squeezing force the cam follower engages the opposed wall so that the lever tends to be propelled in a direction away from the reference position by the squeezing force.

14. The combination as claimed in claim 4 in which the frame is hollow having opposed inner walls on opposite sides of the drum, the magnetically saturable tubes being secured to the opposed walls parallel to one another and to the axis of the drum.

15. The combination as claimed in claim 1 or in claim 2 or in claim 3 or in claim 4 in which the palm rest is in the form of a terminal ball secured to the first element of the lever and in which the finger grip is in the form of an annular enlargement on the second element.

16. The combination as claimed in claim 1 or in claim 2 or in claim 3 or in claim 4 in which at least a portion of the cam track has a radius with respect to the rocking axis of the lever which increases progressively with the angular displacement of the lever from its reference position.

17. The combination as claimed in claim 1 or in claim 2 or in claim 3 or in claim 4 in which the first and second elements of the quadrant lever are in the form of inner and outer mated tubes the inner tube carrying the palm rest and the outer tube the finger grip, the cam follower being connected to the outer tube, a slidable plug in the inner tube, the inner tube having a longitudinal clearance slot adjacent the plug, means extending through the clearance slot for connecting the outer tube to the plug, the spring being in the form of a coil spring interposed above the plug so that the outer tube and cam follower are urged downwardly with respect to the cam track.

18. The combination as claimed in claim 1 or in claim 2 or in claim 3 or in claim 4 in which at least one detent is effectively provided between the lever and the frame for detenting the motion of the lever at a selected control position.

19. The combination as claimed in claim 1 or in claim 2 or in claim 3 or in claim 4 in which at least a portion of the cam track has a radius with respect to the rocking axis of the lever which decreases with the angular displacement of the lever from its reference position.

20. The combination as claimed in claim 1 or in claim 2 or in claim 3 or in claim 4 in which the palm rest and finger grip are located on one side of the rocking axis of the lever while the cam follower and cam track are located on the other side of the rocking axis.

21. The combination as claimed in claim 1 or in claim 2 or in claim 3 or in claim 4 wherein, for a substantial range of lever positions distinct from the reference position, the resilient engagement of a cam follower and a cooperating cam surface tends to return the lever to its reference position.

* * * * *